US009207686B2

(12) United States Patent
Mattingly et al.

(10) Patent No.: US 9,207,686 B2
(45) Date of Patent: *Dec. 8, 2015

(54) VERSATILE SYSTEMS FOR CONTINUOUS IN-LINE BLENDING OF BUTANE AND PETROLEUM

(75) Inventors: Larry D. Mattingly, Sanford, FL (US); Steven M. Vanderbur, Houston, TX (US)

(73) Assignee: SUNOCO PARTNERS MARKETING & TERMINALS L.P., Philadelphia, PA (US)

( * ) Notice: Subject to any disclaimer, the term of this patent is extended or adjusted under 35 U.S.C. 154(b) by 688 days.

This patent is subject to a terminal disclaimer.

(21) Appl. No.: 13/451,715

(22) Filed: Apr. 20, 2012

(65) Prior Publication Data

US 2012/0203038 A1     Aug. 9, 2012

Related U.S. Application Data

(63) Continuation of application No. 12/633,431, filed on Dec. 8, 2009, now Pat. No. 8,176,951, which is a continuation of application No. 11/407,523, filed on Apr. 20, 2006, now Pat. No. 7,631,671, which is a (Continued)

(51) Int. Cl.
*G05D 11/00* (2006.01)
*G05D 11/13* (2006.01)
*C10L 1/06* (2006.01)

(52) U.S. Cl.
CPC ............... *G05D 11/133* (2013.01); *C10L 1/06* (2013.01); *G05D 11/132* (2013.01); *G05D 11/139* (2013.01); *Y10T 137/7759* (2013.01); *Y10T 137/86823* (2013.01)

(58) Field of Classification Search
USPC ............ 141/9, 83, 104, 105; 137/486, 625.41
See application file for complete search history.

(56) References Cited

U.S. PATENT DOCUMENTS

| 2,246,875 A | 6/1941 | Carney |
| 2,297,185 A | 9/1942 | Hollander et al. |
| 3,179,291 A | 4/1965 | Umbach et al. |

(Continued)

FOREIGN PATENT DOCUMENTS

| CA | 2435113 | 1/2005 |
| WO | WO 2007-124058 | 11/2007 |

OTHER PUBLICATIONS

Macungie Station Butane Blending Diagram, Jan. 15, 2004.*

(Continued)

*Primary Examiner* — Timothy L Maust
*Assistant Examiner* — Timothy P Kelly
(74) *Attorney, Agent, or Firm* — Clark G. Sullivan; Troutman Sanders LLP (57) ABSTRACT

A system and method are provided for in-line processes of blending butane into gasoline streams, and for blending butane into a gasoline stream at any point along a petroleum pipeline. The invention additionally provides a method for measuring the vapor pressure and vapor to liquid ratio of the gasoline, both upstream and downstream of the blending operation, as well as the sulfur content of the butane entering the blending operation. The blending operation can be controlled to ensure that the blended gasoline meets EPA requirements for vapor pressure and sulfur content of gasoline. The invention further provides a method for accessing and monitoring the operation off-site.

17 Claims, 5 Drawing Sheets

Related U.S. Application Data continuation-in-part of application No. 10/759,515, filed on Jan. 16, 2004, now Pat. No. 7,032,629, which is a continuation of application No. 10/071,191, filed on Feb. 8, 2002, now Pat. No. 6,679,302.

(60) Provisional application No. 60/267,844, filed on Feb. 9, 2001.

(56) References Cited

U.S. PATENT DOCUMENTS

| | | | |
|---|---|---|---|
| 3,342,199 A | 9/1967 | McEvoy | |
| 3,410,293 A | 11/1968 | Ernyei | |
| 3,484,590 A | 12/1969 | Stanton | |
| 3,751,644 A | 8/1973 | Mayer | |
| 3,813,925 A | 6/1974 | Fenske et al. | |
| 3,904,508 A | 9/1975 | Whyte et al. | |
| 3,999,959 A | 12/1976 | Bajek | |
| 4,268,701 A | 5/1981 | Dang Vu et al. | |
| 4,523,928 A | 6/1985 | Hillman et al. | |
| 4,543,819 A | 10/1985 | Chin et al. | |
| 4,876,653 A | 10/1989 | McSpadden et al. | |
| 4,882,041 A | 11/1989 | Scott | |
| 5,004,850 A | 4/1991 | Wilson | |
| 5,093,533 A | 3/1992 | Wilson | |
| 5,133,391 A | 7/1992 | Johansson et al. | |
| 5,163,586 A | 11/1992 | Zinsmeyer | |
| 5,193,594 A | 3/1993 | Johansson et al. | |
| 5,208,402 A | 5/1993 | Wilson | |
| 5,271,526 A | 12/1993 | Williams | |
| 5,344,044 A | 9/1994 | Hayden et al. | |
| 5,423,607 A | 6/1995 | Jones et al. | |
| 5,430,295 A | 7/1995 | Le Febre et al. | |
| 5,542,450 A | 8/1996 | King et al. | |
| 5,823,669 A | 10/1998 | Jones | |
| 5,860,457 A | 1/1999 | Andersson | |
| 5,975,353 A | 11/1999 | Finlayson | |
| 5,979,705 A | 11/1999 | Kaehler et al. | |
| 6,026,991 A | 2/2000 | Matthews | |
| 6,109,286 A | 8/2000 | Johnston | |
| 6,161,060 A | 12/2000 | Collins | |
| 6,163,738 A | 12/2000 | Miller | |
| 6,258,987 B1 | 7/2001 | Schmidt et al. | |
| 6,328,772 B1 | 12/2001 | Scott et al. | |
| 6,679,302 B1 | 1/2004 | Mattingly et al. | |
| 7,032,629 B1 | 4/2006 | Mattingly et al. | |
| 7,631,671 B2 | 12/2009 | Mattingly et al. | |
| 8,176,951 B2 | 5/2012 | Mattingly et al. | |
| 8,192,510 B2 | 6/2012 | Mattingly et al. | |
| 8,597,380 B2 * | 12/2013 | Buchanan | 44/452 |
| 8,748,677 B2 | 6/2014 | Buchanan | |
| 2005/0022446 A1 | 2/2005 | Brundage et al. | |
| 2005/0058016 A1 | 3/2005 | Smith et al. | |
| 2006/0278304 A1 | 12/2006 | Mattingly et al. | |
| 2007/0034550 A1 | 2/2007 | Hedrick et al. | |
| 2010/0175313 A1 | 7/2010 | Mattingly et al. | |
| 2012/0216453 A1 | 8/2012 | Mattingly et al. | |

OTHER PUBLICATIONS

Declaration of Steven M. Vanderbur on the operation of the Macungie Station, Apr. 10, 2013, pp. 1-5.*
Grabner Instruments, "About Vapor Pressure Testing," from Grabner Instruments website, 2013.
Haskell, N. B. et al., Front-End Volatility of Gasoline Blend Industrial and Engineering Chemistry, vol. 34, No. 2, Feb. 1942, pp. 167-170.
Stewart, W,E., "Predict RVP of Blends Accurately," Petroleum Refiner, vol. 38, No. 6, Jun. 1959, pp. 231-234.
Standard Test Method for Vapor Pressure of Petroleum Products (Reid Method); from Organic website (http//organic.ulsan.ac.kr/reid.html), 2013.
Vazquez-Esparragoza, J. et al., "How to Estimate Reid Vapor Pressure (RVP) of Blends," Bryan Research &Engineering, Inc., website, Encyclopedia of Chemical Processing and Design, vol. 47, pp. 415-424; Hydrocarbon Processing, Aug. 1992, pp. 135-138.
Compliance Monitoring for Vapor Pressure or Vapor-Liquid Ratio Temperature, MiniVap On-line Petrolab Company website, 2013.
Spectro, "Sulfur Monitors and Analyzers for Fuels and Oils," from Spectro website, 2013.
Sindie, "Sindie On-line Analyzer," from Sindie website, 2013.
Environmental Protection Agency, "Gasoline Blending Regulations," 40 G.F.R. § 80.27, 80.41, 80.46, 80,65, 80,195, 80.340.
Reynolds, Robert E., "The Current Fuel Ethanol Industry Transportation, Marketing, Distribution, and Technical Considerations," Downstream Alternatives Inc., May 15, 2000.
Monder, Dayadeep S., Real-Time Optimization of Gasoline Blending with Uncertain Parameters, University of Alberta, Spring 2001.
EPA Q & A Date Oct. 3, 1994, Abstract.
International Search Report and Written Opinion issued Mar. 5, 2010 in International Patent Application No. PCT/US10/20207.
International Search Report and Written Opinion, dated May 2, 2014, which issued during the prosecution of International Patent Application No. PCT/US2013/038761, which corresponds to the present application.
International Search Report and Written Opinion, dated Jun. 10, 2014, which issued during the prosecution of International Patent Application No. PCT/US2013/069447, which corresponds to the present application.

* cited by examiner

VERSATILE SYSTEMS FOR CONTINUOUS IN-LINE BLENDING OF BUTANE AND PETROLEUM

RELATED APPLICATIONS

This application is a continuation of U.S. Ser. No. 12/633,431, filed Dec. 8, 2009, granted as U.S. Pat. No. 8,176,951 on May 15, 2012, which is a continuation of U.S. Ser. No. 11/407,523, filed Apr. 20, 2006, granted as U.S. Pat. No. 7,631,671 on Dec. 15, 2009, which is a continuation-in-part of U.S. Ser. No. 10/759,515, filed Jan. 16, 2004, granted as U.S. Pat. No. 7,032,629 on Apr. 25, 2006, which is a continuation of U.S. Ser. No. 10/071,191, filed Feb. 8, 2002, granted as U.S. Pat. No. 6,679,302 on Jan. 20, 2004, which claims the benefit of U.S. provisional application No. 60/267,844, filed Feb. 9, 2001, all of which are incorporated herein by reference.

FIELD OF THE INVENTION

The present invention relates to in-line processes for blending butane into a gasoline stream, that allow butane to be blended into a gasoline stream at any point along a petroleum pipeline.

BACKGROUND OF THE INVENTION

Petroleum pipelines are the backbone of this nation's gasoline distribution system, delivering refined fuel products from ports and refineries to storage facilities around the country. Through an intricate network of coordinated deliveries from multiple sources, batches of varying grades and types of fuel travel through these pipelines to predetermined locations. Tank farms are used to store fuel delivered through these pipelines, and to distribute the fuel to other tank farms and ultimately to tanker trucks that deliver the fuel to end use outlets such as retail gasoline stations. Tank farms that simply store the gasoline for further distribution to other tank farms are referred to herein as "intermediate tank farms." Tank farms that dispense the gasoline to tanker trucks for delivery to the end user are referred to herein as "terminal tank farms." Petroleum products are typically dispensed to tanker trucks in what is known as a rack, which usually comprise several outlet ports to which different gasoline transports may be coupled. Some tank farms are used for terminal and intermediate functions, and those farms are referred to herein as "combined use tank farms."

A significant physical property of gasoline is its volatility, or its ability to combust. In order to keep cars performing at a consistent level year-round, gasoline marketers blend agents such as butane with gasoline to increase the Reid vapor pressure and volatility of the gasoline, especially during the colder months. These marketers also add butane to reduce the cost of the gasoline. This blending can occur in-line, so that butane is added directly to a line that is transporting the gasoline. Alternatively, blending can occur in batches, as when butane is added to a storage tank.

Because gasoline vapor emissions from automobiles are a major component of volatile organic compounds (VOC's) in the atmosphere, the United States Environmental Protection Agency (EPA) has promulgated regulations that govern the volatility of gasoline and how much butane can be blended with gasoline. These regulations generally apply from May 1 through September 15, when the gasoline is warmest and most volatile, and require that any blended gasoline be certified for compliance with the volatility guidelines. See 40 C.F.R. §80.27 (2005). The regulations also establish maximum volatility levels for gasoline based on the season of the year, and the region in which the gasoline will be dispensed and sold.

There are two principal methods for assessing the volatility of gasoline: (1) measuring the vapor to liquid ratio, and (2) measuring the vapor pressure. The Reid method is the standard test for measuring the vapor pressure of petroleum products. Reid vapor pressure (RVP) is related to true vapor pressure, but is a more accurate assessment for petroleum products because it considers sample vaporization as well as the presence of water vapor and air in the measuring chamber.

The EPA is also concerned with the sulfur contained in butane, and its emission into the atmosphere when blended gasoline is combusted, and has promulgated regulations that specify how much sulfur is allowed in butane that is added to gasoline, and the testing requirements for assuring that the amounts of sulfur do not exceed the specified amounts. See 40 C.F.R. §§80.195, 80.340(a)(1) (2005). The sulfur content of the butane cannot exceed 30 ppm, and the butane must be sampled at least once every 500,000 gallons of butane to assure compliance. See 40 C.F.R. §80.340(a)(1)-(2) (2005).

Butane is often blended with other gasoline components at the refinery, where it is typically added at the trunk line in response to changes in vapor pressure demand. An exemplary refinery blending process is disclosed in Mayer, U.S. Pat. No. 3,751,644. This patent, which is owned by Sun Oil Company, describes a system for automatically adjusting the amount of butane added to a gasoline stream at a petroleum refinery, based on continuous measurements of the Reid vapor pressure of the gasoline downstream from the point of blending. The described process calculates the amount of butane to be blended based on measurements taken downstream of the blending operation, and does not include measuring the Reid vapor pressure upstream of the blending operation, or calculating the blend ratio based on the Reid vapor pressure upstream from the blending operation.

Bajek's U.S. Pat. No. 3,999,959, which is owned by Universal Oil Products Company, also discloses a system for blending butane and gasoline at a petroleum refinery. The Bajek system blends butane with a low-octane gasoline stream and a high-octane gasoline stream, and then analyzes the blended gasoline to measure characteristics such as Reid vapor pressure and vapor to liquid ratio. Bajek does not disclose monitoring the gasoline upstream of the blending operation, or calculating the blend ratio based upon such upstream monitoring.

Efforts at blending butane at a terminal tank farm have also recently been undertaken. As described in our granted Patent U.S. Pat. No. 6,679,302 (to which this application claims priority), butane can be blended in-line with a gasoline stream immediately before the gasoline is dispensed to a tanker truck, and after it has been withdrawn from the storage tank. In a preferred process described in this patent, the Reid vapor pressure is measured upstream of the blending operation, and the blend ratio is calculated based on the upstream measurement.

Lastly, the inventors are aware of an unpatented system that is used to blend butane and gasoline at several terminal tank farms. These systems continuously monitor the Reid vapor pressure of gasoline that is introduced to a storage tank, and blend butane with the gasoline based upon the vapor pressure measurements. These systems do not continuously monitor the Reid vapor pressure downstream of the blending operation as an integrity check. Instead, they certify the integrity of the blending operation by periodically measuring the Reid vapor pressure of the entire storage tank.

Several methods have been attempted to improve the precision of butane blending and the predictability of Reid vapor pressure in the final product. The Grabner unit is a substantial advance in this respect. The Grabner unit (manufactured by Grabner Instruments) is a measuring device capable of providing Reid vapor pressure and vapor to liquid ratio data for a gasoline sample typically within 6-11 minutes of introducing the sample to the unit. It has been employed at some refineries to consistently measure the volatility of gasoline, and to blend butane with the gasoline based upon an allowable Reid vapor pressure for the gasoline.

SUMMARY OF THE INVENTION

By combining the advantages of in-line vapor pressure monitoring both upstream and downstream of a butane blending operation, the inventors have developed a tightly controlled butane blending system with surprising versatility that can be used to blend butane with petroleum products at practically any point along a petroleum pipeline, regardless of variations in the flow rate of gasoline through the pipeline, the time of year in which the gasoline is delivered, or the ultimate destination to which the gasoline is delivered. For the first time, petroleum vendors and distributors are able to take optimum advantage of the many cost saving and performance benefits that butane blending offers, and to do so without regard to the location where the blending occurs along the pipeline.

Therefore, in one embodiment the invention provides a system for in-line blending of gasoline and butane comprising (a) a gasoline stream; (b) a butane stream; (c) a blending unit for blending said gasoline stream and said butane stream at an actual blend ratio and an actual blend rate to yield a blended gasoline stream; (d) an upstream vapor pressure sensor in sensory communication with said gasoline stream upstream of said blending unit; (e) a downstream vapor pressure sensor in sensory communication with said gasoline stream downstream of said blending unit; and (f) one or more information processing units (IPUs) in informational communication with said upstream vapor pressure sensors, logically programmed to calculate a calculated blend ratio based upon the vapor pressure of said gasoline stream, and for communicating said calculated blend ratio to said blending unit; wherein said blending unit periodically receives said calculated blend ratio from said IPU, and adjusts the actual blend ratio to coincide with said calculated blend ratio.

In one embodiment the gasoline flow rate does not vary over time, and the blend rate can be calculated based upon a preset gasoline flow rate. Such preset flow rates may occur, for example, when gasoline is pumped at a terminal tank farm from a tank to a rack, under the influence of only one mechanical pump. However, in a particularly preferred embodiment, which takes fuller advantage of the versatility of the systems described herein, the gasoline flow rate will vary within a batch, and utilizing the invention will further comprise periodically determining the gasoline flow rate through the pipeline, and periodically recalculating the butane blend rate based upon the gasoline flow rate and the blend ratio calculated by the IPU. In a particularly preferred embodiment, the gasoline flow rate and gasoline vapor pressure will be periodically re-determined at the same frequency, so that the blend ratio and blend rate are both periodically recalculated to account for differences within and among batches in gasoline flow rate and gasoline vapor pressure. In certain embodiments, the gasoline flow rate may be continually or continuously received from the operator of the gasoline pipeline. In another embodiment the invention provides a system for in-line blending of gasoline and butane comprising (a) a gasoline stream having a volumetric flow rate that varies over time; (b) a butane stream; (c) a blending unit for blending said gasoline stream and said butane stream at an actual blend ratio and an actual blend rate to yield a blended gasoline stream; (d) an upstream vapor pressure sensor in sensory communication with said gasoline stream upstream of said blending unit; and (e) one or more information processing units (IPUs) in informational communication with said upstream vapor pressure sensors, logically programmed to calculate a calculated blend ratio and calculated blend rate based upon the vapor pressure and volumetric flow rate of said gasoline stream, and for communicating said calculated blend ratio and calculated blend rate to said blending unit; wherein said blending unit periodically receives said calculated blend ratio and calculated blend rate from said one or more IPUs, and adjusts the actual blend ratio and actual blend rate to coincide with said calculated blend ratio and calculated blend rate.

In a preferred embodiment the blend ratio and blend rate calculations are based upon the time of year in which the blending occurs, the delivery location for the blended gasoline and/or the type of petroleum flowing through the pipeline, because each of these variables governs the allowable vapor pressure in the gasoline, or whether butane can be blended with the petroleum at all. In one such embodiment, the blending operation further comprises an information processing unit and an informational database on which is stored multiple allowable vapor pressures associated with date and/or destination information, and the information processing unit retrieves or receives the date and/or destination of the gasoline stream, and the information processing unit calculates the blend ratio and/or blend rate based upon the allowable vapor pressure for the retrieved date and/or destination of the gasoline stream.

In another such embodiment, the blending operation further comprises an information processing unit and an informational database on which is stored a listing of one or more petroleum products for which butane blending is impermissible, wherein the information processing unit retrieves or receives the type of petroleum flowing through the pipeline and the blend ratio and/or blend rate is calculated based upon the type of petroleum flowing through the pipeline—the rate or ratio equaling zero when a petroleum product to which butane cannot be added is flowing through the pipeline.

In yet another such embodiment, each batch of a petroleum product to flow through the pipeline will have an associated batch code based upon the destination of the batch and/or the type of petroleum product in the batch, and the blending operation further comprises an information processing unit and an informational database on which is stored allowable vapor pressures for each batch code, and the information processing unit retrieves or receives the batch code associated with the batch flowing through the pipeline, and the information processing unit calculates the blend ratio and/or blend rate based upon the allowable vapor pressure for the retrieved batch code. In exemplary embodiments, the rate or ratio equals zero when a petroleum product, such as transmix, to which butane cannot be added is flowing through the pipeline.

The invention will typically be practiced on one skid or platform, such as a square or rectangular concrete slab situated in proximity to the point at which butane is physically added to the pipeline, and it may be practiced at any point on a pipeline downstream of a refinery. For example, the invention may be practiced at an intermediate, terminal, or combination tank farm, either before gasoline is introduced to a storage tank, or after it is withdrawn from a tank.

In another embodiment, the inventors have developed a combination monitoring system that monitors the sulfur content of butane added to a gasoline stream and the vapor pressure of gasoline to which the butane is added. The monitoring equipment for both operations is preferably located in the same area, and in one preferred embodiment the vapor pressure and sulfur monitoring equipment is located on the same platform or skid at the tank farm. The butane may be supplied to the monitoring system by one or multiple sources of butane, which are typically stored in butane bullets that are located on the premises of the tank farm. In this embodiment the invention provides a system for in-line blending of gasoline and butane comprising (a) a gasoline stream; (b) a butane stream; (c) a gasoline vapor pressure sensor, in sensory communication with said gasoline stream; (d) a butane sampling unit for periodically or continuously withdrawing butane from said butane stream; and (e) a blending unit for blending said gasoline stream and said butane stream at a blend ratio into a blended gasoline stream, downstream of said gasoline vapor pressure sensor and said butane sampling unit; wherein said butane sampling unit and said gasoline vapor pressure sensor are located on a platform in proximity to said petroleum pipeline. The butane measurement is preferably made on a semi-automated basis, so that at least one sample of butane is measured for sulfur content at least every 500,000 gallons of butane added to the pipeline.

The apparatus for controlling the blending of the butane and gasoline typically includes two valves—a modulating valve that controls the flow of butane toward the pipeline, and an on/off valve between the modulating valve and the gasoline stream. The amount of butane permitted to flow through the modulating valve can be varied to achieve any desired blend ratio, blend rate, or vapor pressure in the blended gasoline. In one particular embodiment, the modulating valve is under the control of a process control unit, which varies the blend ratio to attain a desired vapor pressure in the blended gasoline, based on the vapor pressure of gasoline entering the blending unit, the vapor pressure of butane entering the blending unit, and the desired vapor pressure of the blended gasoline. The blend rate is then calculated based upon the blend ratio and the rate of flow in the gasoline stream, and the modulating valve is opened or closed to allow butane addition at the rate thus calculated.

In one embodiment, the invention provides modalities for remotely controlling the butane blending operation, and for turning the blending operation on or off in its entirety. This may be accomplished, for example, by controlling the gasoline on/off valve nearest the pipeline, and may be controlled from two or more remote locations, thus giving the pipeline operator, as well as the contract butane blender, control over the process. The blending operation may be manually overridden when, for example, the terminal receives a batch of product with which butane should not be blended, such as transmix, or at certain times of the year when mixing is impermissible, or in emergency type situations.

It has also proven advantageous to coordinate the butane blending information gathered through the blending operation with data that is often gathered and generated separately by the tank farm operator, such as petroleum batch data and rate of flow. The petroleum batch data is particularly useful because, by knowing the time at which a batch began passing, and stopped passing a blending point, one can calculate precisely how much butane was blended with any given batch of petroleum flowing through the petroleum pipeline. Therefore, in still another embodiment the inventors have developed a method of recording the quantity of butane blended with a batch of petroleum in a continuous in-line butane blending operation comprising (a) providing a gasoline stream; (b) providing a butane stream; (c) recording the start time when a batch of gasoline begins to pass through said in-line butane blending operation; (d) recording the end time at which the batch finishes passing through said in-line butane blending operation; (e) recording the quantity of butane blended with said gasoline stream between said start time and end time; and (f) associating said quantity of butane with said batch in an informational database.

The information gathering and reporting methods of the systems of this invention can also be adapted to retrieve, store and generate reports with useful information such as (i) the date, (ii) batch information selected from start and stop time, total volume of gasoline per batch, total volume of butane blended per batch, petroleum type, and petroleum destination, (iii) average blend ratio, (iv) gasoline flow rate, (v) blend ratio, (vi) blend rate, (vii) vapor pressure of said gasoline upstream of the butane blending, (viii) vapor pressure of said gasoline downstream of the butane blending, (ix) vapor to liquid ratio of said gasoline upstream of the butane blending, (x) vapor to liquid ratio of said gasoline downstream of the butane blending, (xii) the amount of butane in one or more tanks of butane on the tank farm, (xiii) the content of sulfur in one or more samples of said butane, (xiv) the pressure of said butane stream at two points along the butane stream, (xv) the settings for daily calibration of a gasoline vapor pressure sensor, and (xvi) the temperature of any butane storage tanks located at the tank farm. All of this data is preferably accessible at a remote location through a suitably programmed information processing and storage unit.

In still another embodiment the systems of the present invention are programmed to automatically vary the blend ratio or blend rate based on the EPA's vapor pressure limitations based on the time of year and geographical region. Therefore, in still another embodiment the invention provides a system for in-line blending of gasoline and butane comprising (a) a gasoline stream having a volumetric flow rate; (b) a butane stream; (c) a blending unit for blending said gasoline stream and said butane stream at an actual blend ratio and an actual blend rate to yield a blended gasoline stream; (d) an upstream vapor pressure sensor in sensory communication with said gasoline stream upstream of said blending unit; (e) one or more informational databases on which is stored seasonal data that prescribes (i) allowable vapor pressures on two or more prescribed dates or ranges of dates, or (ii) whether butane blending is allowed on two or more prescribed dates or ranges of dates; and (f) one or more information processing units (IPUs) in informational communication with said upstream vapor pressure sensors and said informational databases, logically programmed to retrieve the date and to calculate a calculated blend ratio and calculated blend rate based upon the stored seasonal data and the vapor pressure and volumetric flow rate of said gasoline stream, and for communicating said calculated blend ratio and calculated blend rate to said blending unit; wherein said blending unit periodically receives said calculated blend ratio from said IPU, and adjusts the actual blend ratio to coincide with said calculated blend ratio.

These and other objects, features, and advantages of the present invention may be more clearly understood and appreciated from a review of the following detailed description of the disclosed embodiments and by reference to the appended drawings and claims.

DETAILED DESCRIPTION OF THE INVENTION

Methods of Measurement

Throughout this patent application, whenever an analysis of gasoline or butane is disclosed, the analysis is to be performed in accordance with applicable EPA regulations and American Society for Testing and Materials ("ASTM") methods in force as of the date of this application. Therefore, the following ASTM methods are to be used when applicable:

1. For measuring the Reid vapor pressure of reformulated gasoline, ASTM standard method D 5191-01, entitled "Standard Test Method for Vapor Pressure of Petroleum Products (Mini Method)" must be used. The following correlation must also be used to satisfy EPA regulations:

$$RVP_{EPA} = (0.956 * RVP_{ASTM}) - 2.39 \text{ kPa}$$

2. For measuring the sulfur content of butane blended with reformulated gasoline, ASTM standard method D 3246-96 entitled "Standard Test Method for Sulfur in Petroleum Gas by Oxidative Microcoulometry" should be used. When blending with conventional gasoline, EPA regulations permit any ASTM sulfur test method to be used for quality assurance testing, so long as the test results are correlated with method D 3246-96.

Discussion

In a first embodiment, the invention provides a system for in-line blending of gasoline and butane comprising (a) a gasoline stream; (b) a butane stream; (c) a blending unit for blending said gasoline stream and said butane stream at an actual blend ratio and an actual blend rate to yield a blended gasoline stream; (d) an upstream vapor pressure sensor in sensory communication with said gasoline stream upstream of said blending unit; (e) a downstream vapor pressure sensor in sensory communication with said gasoline stream downstream of said blending unit; and (f) one or more information processing units (IPUs) in informational communication with said upstream vapor pressure sensors, logically programmed to calculate a calculated blend ratio based upon the vapor pressure of said gasoline stream, and for communicating said calculated blend ratio to said blending unit; wherein said blending unit periodically receives said calculated blend ratio from said IPU, and adjusts the actual blend ratio to coincide with said calculated blend ratio.

In a second embodiment, the invention provides a system for in-line blending of gasoline and butane comprising (a) a gasoline stream having a volumetric flow rate that varies over time; (b) a butane stream; (c) a blending unit for blending said gasoline stream and said butane stream at an actual blend ratio and an actual blend rate to yield a blended gasoline stream; (d) an upstream vapor pressure sensor in sensory communication with said gasoline stream upstream of said blending unit; and (e) one or more information processing units (IPUs) in informational communication with said upstream vapor pressure sensors, logically programmed to calculate a calculated blend ratio and calculated blend rate based upon the vapor pressure and volumetric flow rate of said gasoline stream, and for communicating said calculated blend ratio and calculated blend rate to said blending unit; wherein said blending unit periodically receives said calculated blend ratio and calculated blend rate from said one or more IPUs, and adjusts the actual blend ratio and actual blend rate to coincide with said calculated blend ratio and calculated blend rate.

In a third embodiment, the invention provides a system for in-line blending of gasoline and butane comprising (a) a gasoline stream; (b) a butane stream; (c) a gasoline vapor pressure sensor, in sensory communication with said gasoline stream; (d) a butane sampling unit for periodically or continuously withdrawing butane from said butane stream; and (e) a blending unit for blending said gasoline stream and said butane stream at a blend ratio into a blended gasoline stream, downstream of said gasoline vapor pressure sensor; wherein said butane sampling unit and said gasoline vapor pressure sensor are located on a platform in proximity to said petroleum pipeline.

In a fourth embodiment, the invention provides a system for in-line blending of gasoline and butane comprising (a) a gasoline stream; (b) a butane stream; and (c) a blending unit for blending said gasoline stream and said butane stream at an actual blend ratio and an actual blend rate to yield a blended gasoline stream comprising an on/off valve between said gasoline stream and said butane stream and a modulating valve that modulates the rate of flow of said butane stream toward said on/off valve. This embodiment may further comprise an upstream vapor pressure sensor in sensory communication with said gasoline stream, upstream of said blending unit.

In a fifth embodiment, the invention provides a system for in-line blending of gasoline and butane comprising (a) a gasoline stream having a volumetric flow rate; (b) a butane stream; (c) a blending unit for blending said gasoline stream and said butane stream at an actual blend ratio and an actual blend rate to yield a blended gasoline stream; (d) an upstream vapor pressure sensor in sensory communication with said gasoline stream upstream of said blending unit; (e) one or more informational databases on which is stored seasonal data that prescribes (i) allowable vapor pressures on two or more prescribed dates or ranges of dates, or (ii) whether butane blending is allowed on two or more prescribed dates or ranges of dates; and (f) one or more information processing units (IPUs) in informational communication with said upstream vapor pressure sensors and said informational databases, logically programmed to retrieve the date and to calculate a calculated blend ratio and calculated blend rate based upon the stored seasonal data, and the vapor pressure and volumetric flow rate of said gasoline stream, and for communicating said calculated blend ratio and calculated blend rate to said blending unit; wherein said blending unit periodically receives said calculated blend ratio from said IPU, and adjusts the actual blend ratio to coincide with said calculated blend ratio.

The systems of the foregoing embodiments may further comprise a gasoline vapor pressure sensor in sensory communication with said gasoline stream downstream of said blending unit, as described as part of the first embodiment. Such embodiments may further comprise one or more informational databases in informational communication with said downstream vapor pressure sensor, wherein said one or more informational databases periodically receive and store vapor pressure measurements from said downstream vapor pressure sensor. The foregoing embodiments may further include a gasoline vapor to liquid ratio sensor, and/or an automated sulfur measuring unit in sensory communication with said butane stream.

Additionally, the systems of the foregoing embodiments may further comprise a butane sampling unit for periodically or continuously withdrawing butane from said butane stream, as described as part of the third embodiment. Said butane sampling units may be under the control of one or more information processing units, wherein said one or more information processing units may cause said butane sampling unit to withdraw into a reservoir at least one sample of butane from said butane stream at least every 500,000 gallons of butane. Said reservoir may be manually withdrawn periodically from said butane sampling unit, and any butane contained in said reservoir may be tested for sulfur content.

The systems of the foregoing embodiments may further comprise (a) a butane storage unit; (b) underground piping for transmitting said butane stream from said butane storage unit to said butane blending unit; (c) a first butane pressure sensor in sensory communication with said butane stream at or near said butane storage unit; (d) a second butane pressure sensor in sensory communication with said butane stream at or near said butane blending unit; and (e) a remote information processing unit in informational communication with said first and second butane pressure sensors, for remotely monitoring and displaying butane pressures detected by said first and second butane pressure sensors. Also, the foregoing embodiments may further comprise (a) a butane storage unit; (b) a temperature gauge for measuring the temperature of butane in said butane storage unit; and (c) a remote information processing unit in informational communication with said temperature gauge, for remotely monitoring and displaying temperatures detected by said temperature gauge.

Significantly, the blending unit described in any of the foregoing embodiments may comprise two valves, as described as part of the fourth embodiment. One valve is an on/off valve located between the gasoline stream and the butane stream. This valve can prevent gasoline from entering the blending unit. The second valve is a modulating valve that controls the flow of butane towards the first valve. The second valve controls the rate of flow of butane by modulating both the pressure of the butane stream passing through the valve as well as the size of the orifice through which the butane stream flows. The modulating valve and/or the on/off valve may be under the control of a process control unit, which varies the blend ratio to attain a desired vapor pressure, based on the vapor pressure of gasoline entering the blending unit, the vapor pressure of butane entering the blending unit, and the desired vapor pressure of the blended gasoline. A butane addition rate may then be calculated based upon the blend ratio and the rate of flow in the gasoline stream, and the modulating valve may be opened or closed to allow butane addition at the rate thus calculated. The valves may also be under the control of one or more remote information processing units.

Additionally, any of the foregoing embodiments may comprise one or more informational databases and an information processing unit (IPU), as described as part of the fifth embodiment, for storing seasonal data, as well as the date, types of petroleum, vapor pressure of gasoline, and delivery location of said gasoline stream, and then blending based upon said seasonal data, date, types of petroleum, vapor pressure, and delivery location of said gasoline stream. In such embodiments, the blending operation may further comprise an information processing unit and an informational database on which is stored multiple allowable vapor pressures associated with seasonal data, date, petroleum type, and/or destination information. The information processing unit then retrieves the corresponding date, petroleum type, and/or destination of the gasoline stream, and the information processing unit calculates the blend ratio and/or blend rate based upon the allowable vapor pressure for the retrieved seasonal data, date, petroleum type and/or destination for the gasoline stream. As used throughout the present application, the term "retrieve" includes both retrieving data and receiving data from another source. The blending unit described in any of the foregoing embodiments may further comprise an information processing unit and an informational database on which is stored a listing of any petroleum products for which blending with butane is impermissible. In such embodiments, the calculated blend rate and/or blend ratio may equal zero when a petroleum product to which butane cannot be added is flowing through the pipeline.

In any of the foregoing embodiments, each batch of a petroleum product to flow through the pipeline may have an associated batch code based upon the destination of the batch and/or the type of petroleum product in the batch, and the blending operation may further comprise an information processing unit and an informational database on which is stored allowable vapor pressures for each batch code. In such embodiments, the information processing unit may retrieve or receive the batch code associated with the batch flowing through the pipeline, and the information processing unit may calculate the blend ratio and/or blend rate based upon the allowable vapor pressure for the retrieved batch code. In such embodiments, the calculated blend rate or blend ratio may equal zero when a petroleum product, such as transmix, to which butane cannot be added is flowing through the pipeline.

The gasoline stream of the foregoing embodiments may have a gasoline flow rate that does not vary over time, and therefore, the blend rate can be calculated based upon a preset gasoline flow rate. As used throughout this application, the term "flow rate" refers to a volume of a fluid that flows past a given point over a given period of time. Alternatively, the gasoline stream may have a gasoline flow rate that varies within a batch of gasoline, and therefore, utilization of the invention will further comprise periodically determining the gasoline flow rate through the pipeline, and periodically recalculating the butane blend rate based upon the gasoline flow rate and a calculated blend ratio. Specifically, any of the foregoing embodiments blending gasoline with constant or variable flow rates may further comprise one or more informational processing units in informational communication with said upstream vapor pressure sensors, logically programmed to calculate a calculated blend ratio and calculated blend rate based upon the vapor pressure and volumetric flow rate of said gasoline stream, and for communicating said calculated blend ratio and calculated blend rate to said blending unit; wherein said blending unit periodically receives said calculated blend ratio and calculated blend rate from said one or more IPUs, and adjusts the actual blend ratio and actual blend rate to coincide with said calculated blend ratio and calculated blend rate.

The foregoing embodiments of the invention may further include a manual switch to shut down the system. The manual switch may operate to turn off an on/off valve that may be located between the gasoline and butane streams. The embodiments of the invention may also include an informational database for storing data accessible to an information processing unit with access to an Internet connection.

The blending units described in the foregoing embodiments of the invention may be placed on a skid or platform. The invention may be located anywhere downstream of a refinery. The invention may also be located at a gasoline tank farm, either before the gasoline stream is introduced to a tank, or after the gasoline stream is withdrawn from the tank. The tank farm may be a terminal gasoline tank farm, an intermediate gasoline tank farm, or a combined use tank farm.

Figure 1:
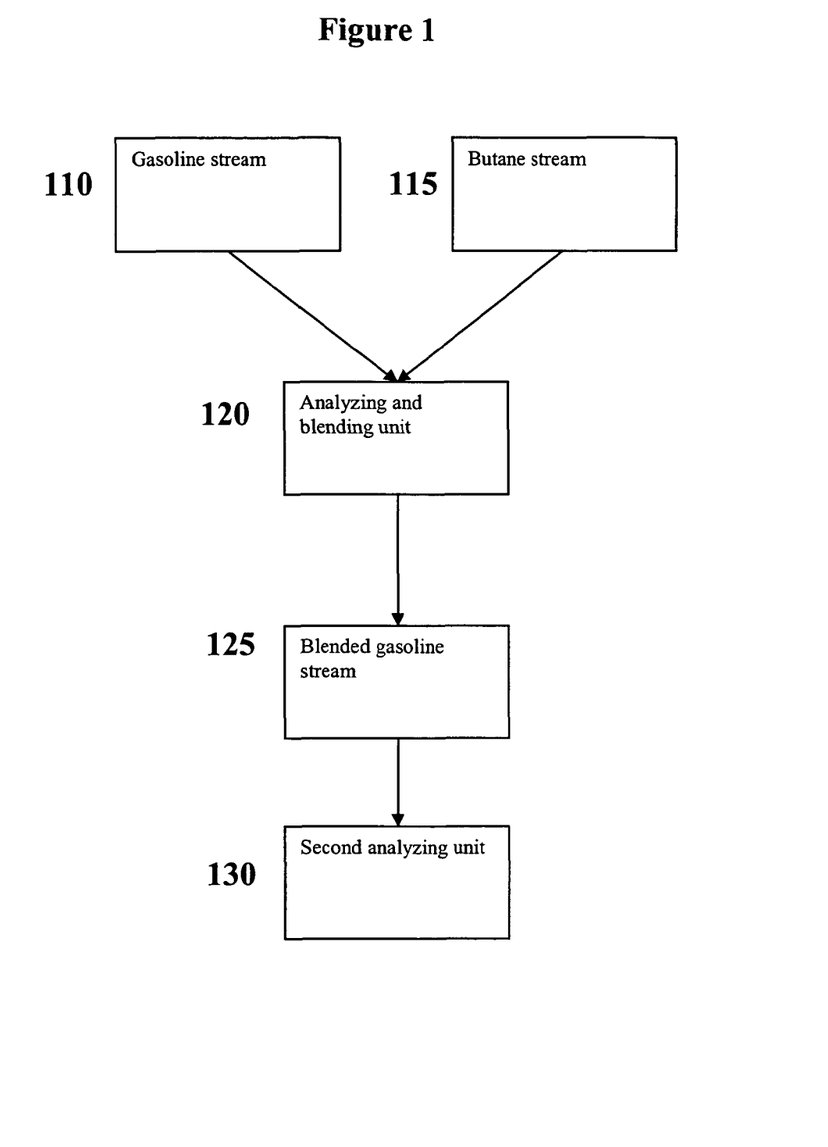
FIG. 1 is a functional block diagram illustrating the architecture of an exemplary butane blending system.

Referring to FIG. 1, this illustrates an overview of a preferred example of components of the foregoing embodiments. It shows a gasoline stream 110 and a butane stream 115 entering an analyzing and blending unit 120, and a blended gasoline stream 125 exiting the analyzing and blending unit 120 and entering a second analyzing unit 130. The analyzing and blending unit 120 may comprise a blending unit, a sulfur measuring unit in sensory communication with said butane stream 115 and a gasoline vapor pressure sensor and/or vapor to liquid ratio sensor in sensory communication with said gasoline stream 110. The second analyzing unit 130 may comprise a vapor pressure sensor and/or vapor to liquid ratio sensor in sensory communication with said blended gasoline stream 125.

In a sixth embodiment, the invention provides a method for in-line blending of gasoline and butane comprising (a) providing a gasoline stream; (b) providing a butane stream; (c) measuring vapor pressure of gasoline in said gasoline stream; (d) calculating a blend ratio based upon said vapor pressure; (e) blending the butane stream and gasoline stream at said blend ratio to provide blended gasoline; and (f) measuring vapor pressure of the blended gasoline stream.

In a seventh embodiment, the invention provides for a method for in-line blending of gasoline and butane comprising (a) providing a gasoline stream having a volumetric flow rate that varies over time; (b) providing a butane stream; (c) periodically measuring vapor pressure of gasoline in the gasoline stream; (d) periodically measuring volumetric flow rate of gasoline in the gasoline stream; (e) calculating a blend ratio based upon said vapor pressure and said volumetric flow rate; and (f) blending, with a blending unit, the butane stream and the gasoline stream at said blend ratio to provide a blended gasoline stream.

In an eighth embodiment, the invention provides a method for in-line blending of gasoline and comprising (a) providing a gasoline stream; (b) providing a butane stream; (c) measuring vapor pressure of gasoline in the gasoline stream; (d) calculating a blend ratio based upon said vapor pressure; (e) periodically or continuously withdrawing butane from said butane stream; (f) periodically or continuously measuring sulfur content of the butane withdrawn from said butane stream; and (g) blending the butane stream and the gasoline stream at said blend ratio to provide a blended gasoline stream.

In a ninth embodiment, the invention provides a method for in-line blending of gasoline and butane to provide a blended gasoline stream comprising (a) providing a gasoline stream; (b) providing a butane stream; (c) controlling a blend ratio of butane from said butane stream and gasoline from said gasoline stream at a blending operation; and (d) controlling whether or not gasoline pressure from said gasoline stream enters the blending operation. This method may further comprise measuring vapor pressure of the gasoline stream, measuring sulfur content of the butane stream, and/or measuring vapor pressure of the blended gasoline stream.

In a tenth embodiment, the invention provides a method for in-line blending of gasoline and butane to provide a blended gasoline stream comprising (a) providing a gasoline stream having a volumetric flow rate; (b) providing a butane stream; (c) measuring vapor pressure of gasoline in the gasoline stream; (d) storing, in one or more informational databases, seasonal data that prescribes (i) allowable vapor pressures on two or more prescribed dates or ranges of dates, or (ii) whether butane blending is allowed on two or more prescribed dates or ranges of dates; (e) calculating a blend ratio based upon current date information, said seasonal data, and said vapor pressure; and (f) blending, with a blending unit, the butane stream and the gasoline stream at said blend ratio to provide a blended gasoline stream.

In an eleventh embodiment, the invention provides a method of recording the quantity of butane blended with a batch of gasoline in a continuous in-line butane blending operation comprising (a) providing a gasoline stream; (b) providing a butane stream; (c) recording a start time when a batch of gasoline begins to pass through said in-line butane blending operation; (d) recording an end time at which the batch finishes passing through said in-line butane blending operation; (e) recording the quantity of butane blended with said gasoline stream between said start time and end time; and (f) associating said quantity of butane with said batch in an informational database.

The eleventh embodiment may further comprise measuring vapor pressure for each batch of blended gasoline. The validation may be done using the chill method. This embodiment may further comprise dividing each batch of blended gasoline into different streams of blended gasoline, and sending each stream to an off-site recipient of blended gasoline.

In an twelfth embodiment, the invention provides a method for off-site monitoring and collection of data at a gasoline and butane blending operation comprising (a) providing a gasoline stream; (b) providing a butane stream; (c) measuring vapor pressure of gasoline in the gasoline stream; (d) calculating a blend ratio based upon said vapor pressure; (e) blending said butane stream and said gasoline stream at said blend ratio to provide a blended gasoline stream; (f) recording values that represent one or more of (i) the date, (ii) batch information selected from start and stop time, total volume of gasoline per batch, total volume of butane blended per batch, petroleum type, and petroleum destination, (iii) average blend ratio, (iv) gasoline flow rate, (v) blend ratio, (vi) blend rate, (vii) vapor pressure of said gasoline upstream of the butane blending, (viii) vapor pressure of said gasoline downstream of the butane blending, (ix) vapor to liquid ratio of said gasoline upstream of the butane blending, (x) vapor to liquid ratio of said gasoline downstream of the butane blending, (xii) the amount of butane in one or more tanks of butane on the tank farm, (xiii) the content of sulfur in one or more samples of said butane, (xiv) the pressure of said butane stream at two points along the butane stream, (xv) the settings for daily calibration of a gasoline vapor pressure sensor, and (xvi) the temperature of any butane storage tanks located at the tank farm; (g) storing said values in an informational database; and (h) providing remote access to said values to an information processing unit with access to an Internet connection.

The foregoing methods may further comprise measuring vapor pressure of the blended gasoline stream, as described as part of the sixth embodiment. Any of the foregoing methods may further comprise measuring gasoline vapor-to-liquid ratio upstream and/or downstream of the blending.

Additionally, any of the foregoing methods may further comprise periodically or continuously withdrawing butane from said butane stream and periodically or continuously measuring sulfur content of the butane withdrawn from said butane stream, as described in the eighth embodiment discussion. These steps may comprise drawing an initial sample of butane from said butane stream, placing the initial sample of butane in a reservoir, repeatedly drawing subsequent samples of butane from said butane stream and placing them in the reservoir until a pre-determined amount of butane has been blended with the gasoline stream, manually withdrawing the reservoir, and measuring the sulfur content of the butane in the reservoir. A typical pre-determined amount of butane is about 500,000 gallons of butane. Measuring sulfur content in the butane stream in any of the foregoing methods may alternatively, or additionally, comprise connecting an automated sulfur measuring unit to the butane stream.

Any of the foregoing methods may further comprise determining the blend ratio of butane and gasoline that will yield a desired vapor pressure in the blended gasoline and blending said butane stream and said gasoline stream at said blend ratio. Said blend ratio may be determined from the vapor pressure of the gasoline in the gasoline stream and the vapor pressure of butane in the butane stream. Determining the blend ratio can be accomplished by setting a desired vapor pressure for the blended gasoline stream, transmitting the desired vapor pressure for the blended gasoline and the vapor pressure of the gasoline and butane streams to an information processing unit, and calculating a blend ratio based on the three vapor pressure values. After calculating the blend ratio, the blending process in any of the foregoing methods may further comprise measuring the vapor pressure of the blended gasoline, transmitting the value for the vapor pressure of the blended gasoline to a logic control unit, and then, using the logic control unit, adjusting the blend ratio of butane and gasoline to achieve the desired vapor pressure in the blended gasoline.

Figure 5:
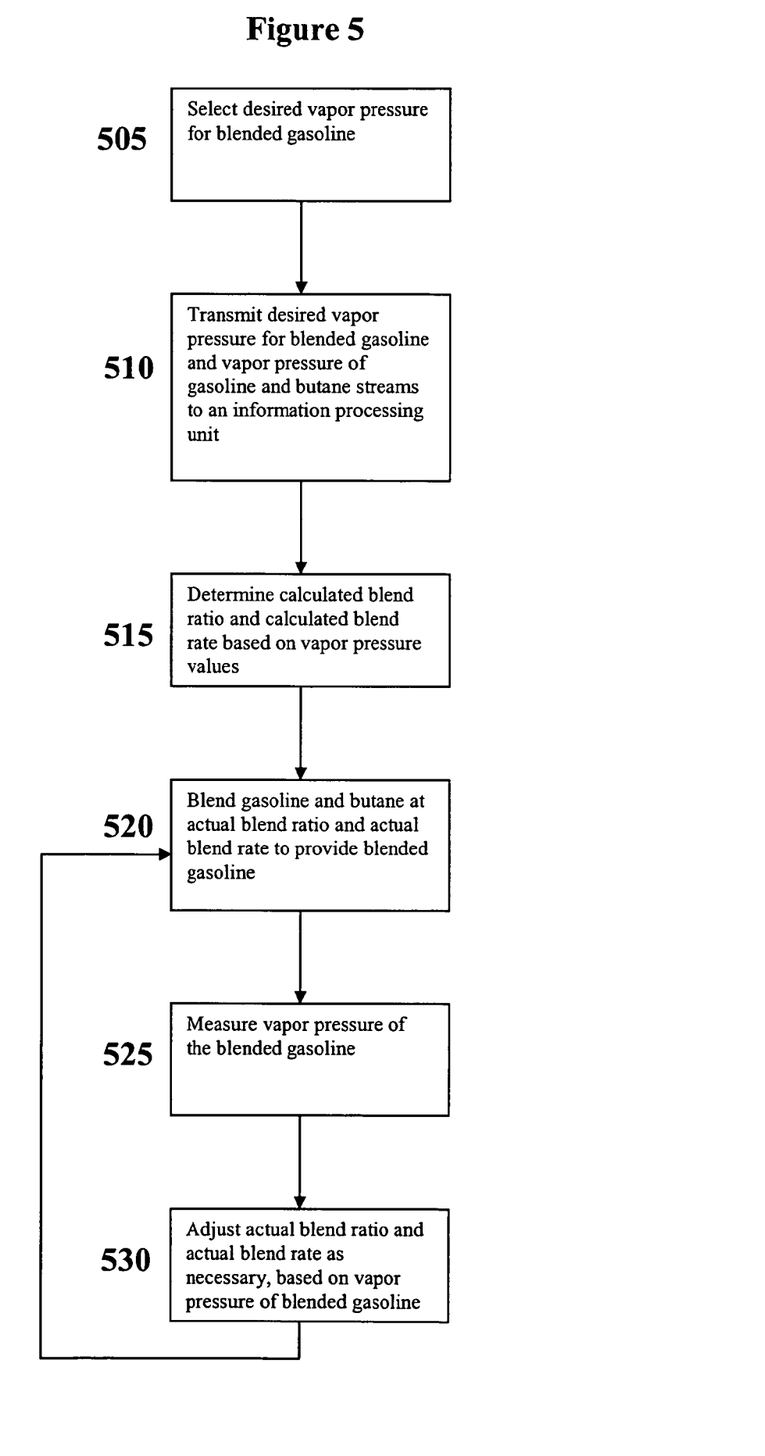
FIG. 5 is a logic flow diagram illustrating an exemplary process for determining the blend ratio of butane and gasoline, monitoring the blended gasoline, and adjusting the blend ratio if necessary.

The illustration in FIG. 5 shows an exemplary process for determining the blend ratio of butane and gasoline in any of the foregoing methods. The process comprises selecting a desired vapor pressure for the blended gasoline 505, transmitting values for the desired vapor pressure, along with the vapor pressure of the gasoline and butane being blended, to an information processing unit 510, and calculating the blend ratio based on those values 515. The process shown in FIG. 5 further comprises blending gasoline and butane at the blend ratio to provide blended gasoline 520, measuring the vapor pressure of the blended gasoline 525, and adjusting the blend ratio as necessary based on the vapor pressure of the blended gasoline and the desired vapor pressure 530.

The blending procedure utilized in any of the foregoing embodiments may further comprise analyzing additional factors beyond vapor pressure, such as the time of year, delivery location, and type of petroleum. In such embodiments, the blending procedure may further comprise measuring vapor pressure of the gasoline stream and blended stream, and comparing said vapor pressures to allowable vapor pressures based on the time of year, the delivery location for the blended gasoline, and the type of petroleum flowing through the pipeline. Such embodiments may further comprise utilizing an information processing unit and an informational database on which is stored multiple allowable vapor pressures associated with date, petroleum type, and/or destination information, retrieving the corresponding date, petroleum type, and/or destination of the gasoline stream with the information processing unit, and calculating, with the information processing unit, the blend ratio and/or blend rate based upon the allowable vapor pressure for the retrieved date, petroleum type and/or destination for the gasoline stream. In such embodiments, analyzing delivery location and type of petroleum may be accomplished by analyzing a batch code that is based upon the delivery location and type of petroleum associated with each batch of petroleum product to pass through the blending operation. The blending procedure described in any of the foregoing methods may further comprise setting a blend rate and/or blend ratio to zero when a petroleum product to which butane cannot be added is flowing through the pipeline.

The blending procedure utilized in the foregoing methods may further comprise analyzing volumetric flow rate of the gasoline in the gasoline stream. In any of the foregoing methods, the gasoline in the gasoline stream may have a constant volumetric flow rate. Alternatively, the gasoline in the gasoline stream may have a volumetric flow rate that varies within a batch. Where the volumetric flow rate of gasoline in the gasoline stream varies within a batch, any of the foregoing methods may further comprise periodically determining the volumetric flow rate of the gasoline and periodically recalculating the blend rate based upon the gasoline flow rate and the blend ratio. The gasoline flow rate and gasoline vapor pressure may be periodically re-determined at the same frequency, so that the blend ratio and blend rate are both periodically recalculated to account for differences within and among batches in gasoline flow rate and gasoline vapor pressure.

Figure 4:
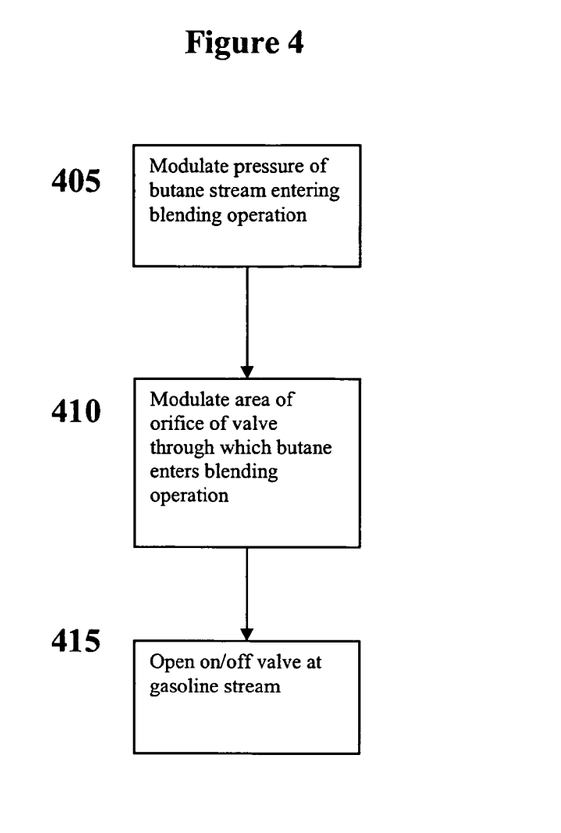
FIG. 4 is a logic flow diagram illustrating operations of the two valves that control the flow of butane and gasoline into the blending unit.

The rate at which a fluid flows through a valve is a function of the pressure of the fluid exiting the valve, and the area of the orifice through which the fluid flows through the valve. Therefore, said butane stream and said gasoline stream may be blended at a blend ratio by steps comprising modulating pressure of the butane stream, modulating area of an orifice of a valve through which the butane stream flows toward the gasoline stream, and opening an on/off valve along the gasoline stream. FIG. 4 illustrates an exemplary process for blending butane and gasoline at a given blend ratio. The process comprises modulating the pressure of the butane stream entering the blending operation 405, modulating the size of the orifice through which butane enters the blending operation 410, and opening an on/off valve along the gasoline stream 415.

In any of the foregoing methods, the butane stream may be fed by a source of butane that comprises a consolidation of multiple butane bullets. The sulfur content of butane may be measured downstream of said consolidation of multiple butane bullets.

In any of the foregoing methods, the gasoline stream may comprise a plurality of incoming batches of gasoline, and the blending may yield a plurality of batches of blended gasoline. When the gasoline stream comprises a plurality of incoming batches of gasoline, the in-line blending of gasoline and butane and the monitoring of the vapor pressure may be performed on each batch of incoming gasoline. When the blending yields a plurality of blended batches, sulfur content and vapor pressure for each batch of blended gasoline may be validated. The validation may be done using chill method techniques. Furthermore, each batch of blended gasoline may be divided into different streams of blended gasoline, and each stream may be sent to an off-site recipient of blended gasoline.

Any of the foregoing methods may further comprise measuring vapor to liquid ratio of the gasoline in the gasoline stream and/or in the blended gasoline stream. Measuring the gasoline stream for vapor pressure and/or vapor to liquid ratio can be accomplished by drawing a sample of gasoline from the gasoline stream, measuring the vapor pressure and/or vapor to liquid ratio of the sample of gasoline, and returning the sample of gasoline to the gasoline stream. The vapor pressure and/or vapor to liquid ratio of the gasoline may be measured every seven minutes. Likewise, measuring the blended gasoline stream for vapor pressure and/or vapor to liquid ratio can be accomplished by drawing a sample of blended gasoline from the blended gasoline stream, measuring the vapor pressure and/or vapor to liquid ratio in the sample of blended gasoline; and returning the sample of blended gasoline to the blended gasoline stream. The measurements of the vapor pressure and/or vapor to liquid ratio may also be done every seven minutes.

Figure 3:
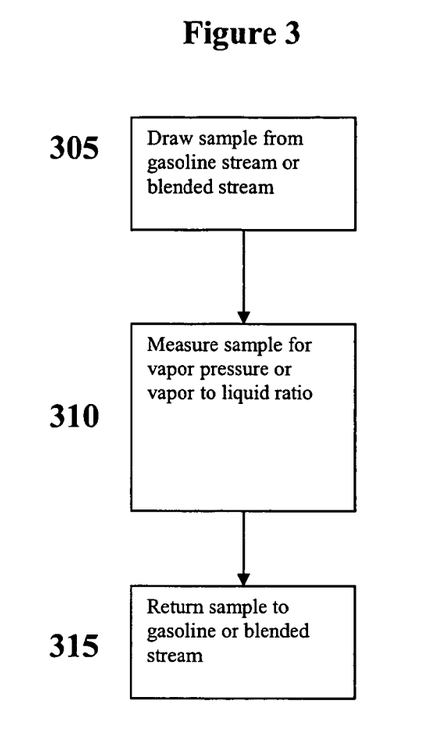
FIG. 3 is a logic flow diagram illustrating an overview of an analysis of the gasoline or blended gasoline streams.

FIG. 3 illustrates an exemplary procedure for measuring the vapor pressure and/or vapor to liquid ratio in the gasoline stream or blended gasoline stream. The procedure comprises drawing a sample from the gasoline or blended stream 305, measuring the vapor pressure and/or vapor to liquid ratio of the sample 310, and returning the sample to the gasoline or blended stream 315.

Any of the foregoing methods may further comprise manually shutting down the blending operation in emergencies, during periods of time when blending is not permitted, or if a batch of transmix enters the blending operation. Manually shutting down the blending operation may be accomplished by controlling the on/off valve near the gasoline stream, and said valve may be controlled from two or more remote locations.

Additionally, any of the foregoing methods may further comprise (a) recording values that represent one or more of: (i) the date, (ii) batch information selected from start and stop time, total volume of gasoline per batch, total volume of butane blended per batch, petroleum type, and petroleum destination, (iii) average blend ratio, (iv) gasoline flow rate, (v) blend ratio, (vi) blend rate, (vii) vapor pressure of said gasoline upstream of the butane blending, (viii) vapor pressure of said gasoline downstream of the butane blending, (ix) vapor to liquid ratio of said gasoline upstream of the butane blending, (x) vapor to liquid ratio of said gasoline downstream of the butane blending, (xii) the amount of butane in one or more tanks of butane on the tank farm, (xiii) the content of sulfur in one or more samples of said butane, (xiv) the pressure of said butane stream at two points along the butane stream, (xv) the settings for daily calibration of a gasoline vapor pressure sensor, and (xvi) the temperature of any butane storage tanks located at the tank farm; (b) storing said values in an informational database; and (c) providing remote access to said values to an information processing unit with access to an Internet connection.

Figure 2:
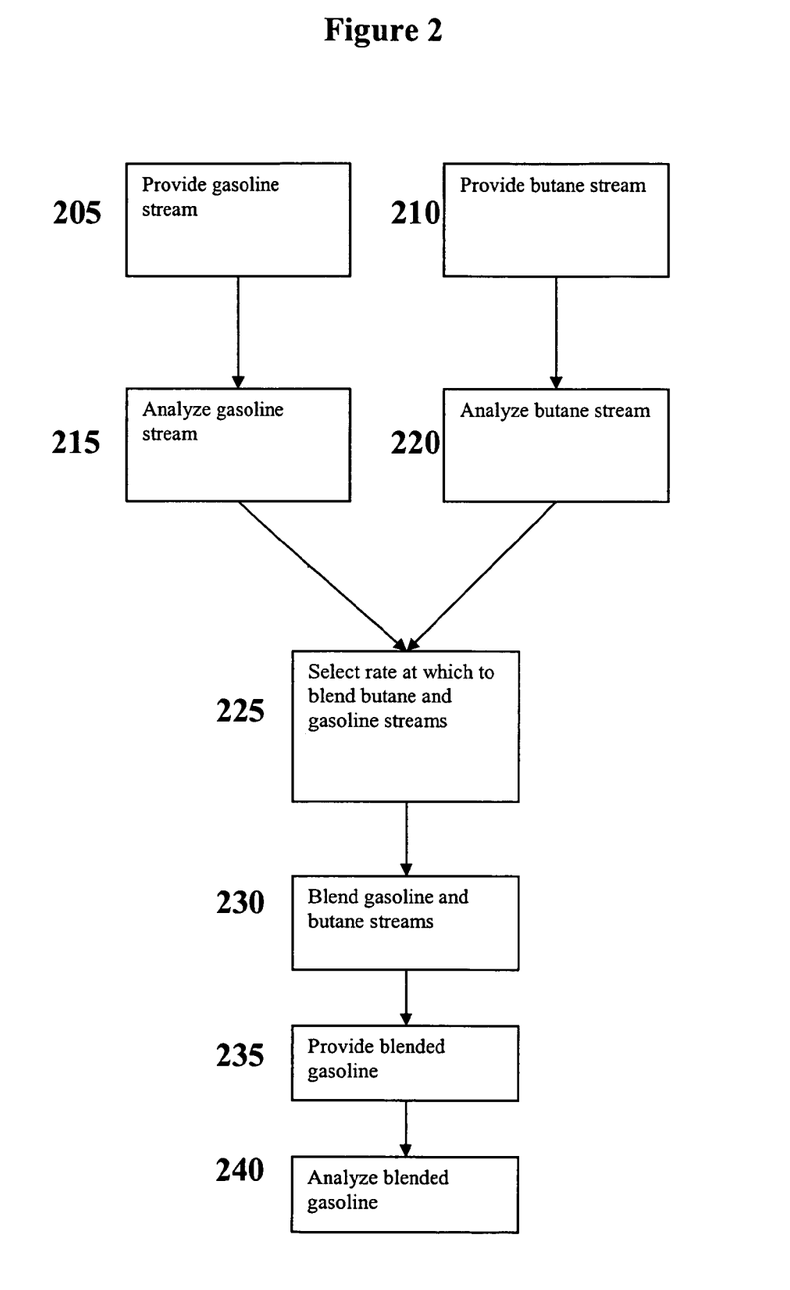
FIG. 2 is a logic flow diagram illustrating an overview of an exemplary butane and gasoline blending method.

Referring to FIG. 2, this flow chart diagram illustrates an exemplary overview of the blending process of any of the foregoing methods. The blending process may comprise providing a gasoline stream 205, providing a butane stream 210, analyzing the gasoline stream 215, analyzing the butane stream 220, selecting a rate at which to blend the streams 225, blending the streams 230, providing blended gasoline 235, and analyzing the blended gasoline 240.

In any of the foregoing methods, the gasoline stream may comprise reformulated gasoline. Additionally, in the foregoing methods, the vapor pressure measured may be Reid vapor pressure instead of true vapor pressure.

Furthermore, in any of the foregoing methods, the blending and analyzing of butane and gasoline may be performed on one skid or platform. Additionally, any of the foregoing methods may be practiced anywhere downstream of a refinery, including at a rack with a dispensing unit. The method may also be practiced at a gasoline tank farm, either before the gasoline is introduced to a tank, or after the gasoline is withdrawn from the tank. The tank farm may be a terminal gasoline tank farm, an intermediate gasoline tank farm, or a combined use tank farm.

What is claimed is:

1. A method for in-line blending of gasoline and a volatility modifying agent comprising:
   a) providing a continuously flowing gasoline stream that comprises:
      i) a plurality of batches of different gasoline types;
      ii) a gasoline flow rate that varies over time; and
      iii) a plurality of gasoline vapor pressures;
   b) providing an allowable vapor pressure;
   c) providing a stream of said agent that comprises an agent vapor pressure;
   d) periodically determining said gasoline vapor pressure;
   e) periodically determining said gasoline flow rate;
   f) calculating a blend ratio based upon said agent vapor pressure, said gasoline vapor pressure, and said allowable vapor pressure; and
   g) blending said agent stream and said gasoline stream at a blending unit at said blend ratio to provide a blended gasoline stream having a blended vapor pressure less than or equal to said allowable vapor pressure.

2. The method of claim 1 further comprising calculating a blend rate based upon said flow rate.

3. The method of claim 1, further comprising:
   a) providing a first information processing unit (IPU) on which said calculating is performed;
   b) providing a second IPU which generates pulses of flow rate data;
   c) transmitting said flow rate data to said first IPU; and
   d) calculating a blend rate on said first IPU based upon said flow rate data from said second IPU.

4. The method of claim 1 wherein said gasoline stream comprises a consolidation of gasoline batches from multiple sources at disparate locations.

5. The method of claim 1 further comprising:
   a) storing, in one or more informational databases, seasonal data that prescribes (i) said allowable vapor pressure on two or more prescribed dates or ranges of dates, or (ii) whether agent blending is allowed on two or more prescribed dates or ranges of dates; and
   b) calculating said blend ratio based upon current date information and said seasonal data.

6. The method of claim 1 further comprising:
   a) recording a start time when a recorded batch begins to flow past said blending unit;
   b) recording an end time when said recorded batch finishes flowing past said agent blending unit;
   c) recording a quantity of agent blended with said gasoline stream between said start time and said end time; and
   d) associating said quantity of agent with said recorded batch in an informational database.

7. A system for in-line blending of gasoline and a volatility modifying agent comprising:
   a) a continuously flowing gasoline stream that comprises:
      i) a plurality of batches of different types of gasoline;
      ii) a gasoline flow rate that varies over time; and
      iii) a plurality of gasoline vapor pressures;
   b) an agent stream that comprises an allowable agent vapor pressure;
   c) a blending unit for blending said gasoline stream and said agent stream at an actual blend ratio and an actual blend rate to yield a blended gasoline stream;
   d) an upstream vapor pressure sensor in sensory communication with said gasoline stream upstream of said blending unit; and
   e) one or more information processing units (IPUs) in informational communication with said upstream vapor pressure sensors, logically programmed to calculate a calculated blend ratio and calculated blend rate based upon vapor pressure and volumetric flow rate of said gasoline stream, and for communicating said calculated blend ratio and calculated blend rate to said blending unit;
   f) wherein said blending unit periodically accesses said calculated blend ratio and calculated blend rate from said one or more IPUs, and adjusts the actual blend ratio and actual blend rate to coincide with said calculated blend ratio and calculated blend rate.

8. The system of claim 7 further comprising a downstream vapor pressure sensor in sensory communication with said gasoline stream downstream of said blending unit.

9. The system of claim 7 further comprising one or more informational databases in informational communication with said downstream vapor pressure sensor, wherein said one or more informational databases periodically access and store vapor pressure measurements from said downstream vapor pressure sensor.

10. The system of claim 7 wherein said one or more IPUs are further logically programmed to calculate said calculated blend ratio based upon the date.

11. The system of claim 7 wherein said blending unit comprises:
   a) an on/off valve between said gasoline stream and said agent stream; and
   b) a modulating valve that modulates rate of flow of said agent stream toward said on/off valve.

12. The system of claim 7 further comprising:
   a) one or more informational databases on which is stored seasonal data that prescribes (i) allowable vapor pressures on two or more prescribed dates or ranges of dates, or (ii) whether agent blending is allowed on two or more prescribed dates or ranges of dates; and
   b) one or more information processing units (IPUs) in informational communication with said upstream vapor pressure sensors and said informational databases, logically programmed to retrieve the date and to calculate a calculated blend ratio and calculated blend rate based upon the stored seasonal data and vapor pressure and volumetric flow rate of said gasoline stream, and for communicating said calculated blend ratio and calculated blend rate to said blending unit;
   c) wherein said blending unit periodically accesses said calculated blend ratio from said IPU, and adjusts the actual blend ratio to coincide with said calculated blend ratio.

13. The system of claim 7 further comprising an agent sampling unit for periodically or continuously withdrawing agent from said agent stream, wherein:
   a) said agent sampling unit is under the command of one or more information processing units (IPUs), wherein said one or more IPUs command said agent sampling unit to withdraw into a reservoir at least one sample of agent from said agent stream at least every 500,000 gallons of agent; and
   b) said reservoir is manually withdrawn periodically from said agent sampling unit, and any agent contained in said reservoir is tested for sulfur content.

14. The system of claim 13 wherein said agent sampling unit and said agent vapor pressure sensor are located on a platform in proximity to said petroleum pipeline.

15. The system of claim 7 wherein said blending unit comprises:
   a) an on/off valve between said gasoline stream and said agent stream; and
   b) a modulating valve that modulates rate of flow of said agent stream toward said on/off valve.

16. A method for in-line blending of petroleum and a volatility modifying agent comprising:
   a) providing a petroleum stream that comprises a petroleum vapor pressure and a flow rate;
   b) providing an agent stream that comprises an agent vapor pressure;
   c) providing an allowable vapor pressure;
   d) calculating a blend ratio based upon a blended petroleum vapor pressure, said agent vapor pressure, said flow rate and said allowable vapor pressure;
   e) blending said agent stream and said petroleum stream at said blend ratio to provide a blended petroleum stream wherein the blended vapor pressure is less than or equal to said allowable petroleum vapor pressure; and
   f) measuring vapor pressure of the blended petroleum stream.

17. The method of claim 16, further comprising:
   a) withdrawing agent from said agent stream; and
   b) measuring sulfur content of said agent withdrawn from said agent stream.

* * * * *